United States Patent [19]

Kitajima

[11] Patent Number: 5,589,939

[45] Date of Patent: Dec. 31, 1996

[54] LASER SURVEYING SYSTEM

[75] Inventor: Eiichi Kitajima, Yokohama, Japan

[73] Assignee: Nikon Corporation, Tokyo, Japan

[21] Appl. No.: 604,294

[22] Filed: Feb. 21, 1996

Related U.S. Application Data

[63] Continuation of Ser. No. 363,342, Dec. 23, 1994, abandoned.

[30] Foreign Application Priority Data

Dec. 28, 1993 [JP] Japan ................................. 5-348925

[51] Int. Cl.$^6$ ............................ G01B 11/00; G01C 5/00
[52] U.S. Cl. ...................... 356/375; 356/373; 356/400; 250/559.29
[58] Field of Search ........................... 356/373, 375, 356/400, 138; 250/559.29; 33/DIG. 21

[56] References Cited

U.S. PATENT DOCUMENTS 4,997,283 3/1991 Danielson et al. ................... 356/375
5,251,013 10/1993 Danielson et al. ................... 356/375

FOREIGN PATENT DOCUMENTS 0257525 3/1988 European Pat. Off. .
4-56243 9/1992 Japan .
2200474 8/1988 United Kingdom .

Primary Examiner—F. L. Evans
Attorney, Agent, or Firm—Shapiro and Shapiro

[57] ABSTRACT

Disclosed is a laser surveying system in which devices installed at measuring points are inexpensive and small in weight, and a distribution of codes is not needed for transmitting positional data obtained, this system being capable of continuously quickly making a three-dimensional measurement of the displacement. When the laser beam projected from a light projector sweeps a reflecting device on an object, reflecting surfaces supply the laser beam with positional data. A displacement of the object is measured based on the transmitted positional data from the reflected laser beam.

14 Claims, 12 Drawing Sheets

LASER SURVEYING SYSTEM

This is a continuation of application Ser. No. 08/363,342 filed Dec. 23, 1994, now abandoned.

BACKGROUND OF THE INVENTION

1. Field of the Invention

The present invention relates generally to a laser surveying system and, more particularly, to a laser surveying system for measuring a displacement such as a sinkage of a structure, a ground subsidence and a distortion change of a bridge.

2. Related Background Art

FIG. 11 illustrates a conventional laser surveying system for measuring a displacement such as a sinkage of a structure, a ground subsidence and a distortion change of a bridge. Referring to FIG. 11, a light projector 1 is installed at an unmovable point. Mounted next at measuring points of a structure 2 are a plurality of laser beam position detecting devices 3, 4, 5, 6 for obtaining pieces of positional data of laser beams. For transmitting the obtained positional data of the laser beams, positional data output codes 7 are distributed from the laser beam position detecting devices 3, 4, 5, 6 and then connected to a multiplexer 8. With respect to a quantity of sinkage of the structure, the positional data outputted from the laser beam position detecting devices 3, 4, 5, 6 can be sequentially selected by the multiplexer 8, and, therefore, the outputs from the multiplexer 8 are data-processed by a personal computer 9, thus making it possible to analyze a state of the sinkage of the structure 2.

The light projector 1 constituting this laser surveying system includes a light projection mechanism unit structured as illustrated in FIG. 12. Laser beams from a laser diode 11 are collimated by a collimating lens 12 into substantially parallel laser beams and thereafter deflected by a reflecting mirror 13. The thus deflected laser beams L are emitted in a horizontal direction. The laser beams L are always emitted in the horizontal direction by an auto compensator constructed of a movable cylinder 14 and a fixed cylinder 15. The reflecting mirror 13 is fixed to a rotary unit 16 but rotatable, thus forming a horizontal laser surface. An emerging direction of the laser beams L can be set in directions exclusive of the horizontal direction by using a prism for changing an angle thereof.

Further, FIG. 13 is a front view of a light receiving device but includes a circuit diagram. As illustrated in FIG. 13, in the laser beam position detecting devices 3, 4, 5, 6 constituting this laser surveying system, a light receiving device 18 is constructed of a light receiving element 18a having a wedge-like shape expanding upward from under and a light receiving element 18b having a wedge-like shape expanding downward from above. Rates of light receiving quantities of the light receiving elements 18a, 18b change depending on a height position of an incidence of the laser beams L. Output signals S1A, S1B from the light receiving elements 18a, 18b are processed by a detection circuit 19 and an output circuit 20, thereby outputting a height position signal.

Further, Japanese Patent Publication No. 4-56243 discloses a level for a specific height measurement which includes an image sensor constructed of a string of reading elements and capable of digital direct reading and displaying on the basis of an image output of the image sensor by use of symbolic patterns formed on a levelling rod, corresponding to height values.

In the above-mentioned laser surveying system, however, the laser beam position detector outputs the positional data of the laser beam as electrical positional data. Hence, codes for outputting the positional data have to be distributed in order to connect the laser beam position detector to a multiplexer. Consequently, there arises a problem in which a mounting position of the laser beam position detector is confined to a code distributable position in terms of a necessity for distributing the codes. There also exists a problem in which, when the number of measuring points increases, the code distribution becomes correspondingly complicated, resulting in a difficulty of distributing the codes.

There is also such a problem that the laser beam position detector is expensive, and the price rises with a greater number of measuring points. A further problem is that the laser beam position detector is large in weight, enough to deform a measured object such as a structure or the like, and this exerts an adverse influence on the measured value.

Moreover, the above-mentioned conventional laser surveying system is capable of making a one-dimensional measurement of the displacement but is incapable of making two- and three-dimensional measurements of the displacement. There further arises a problem in which such measurements of the displacement have to be done by other expensive measuring devices.

The technique disclosed in Japanese Patent Publication No. 4-56243 involves the use of the intricate symbolic patterns and entails focusing of the level on the levelling rod. For this reason, it is required that the levelling rod be illuminated with light, and, if focused on a plurality of levelling rods, it is difficult to quickly effect focusing on each levelling rod.

SUMMARY OF THE INVENTION

It is an object of the present invention to provide a laser surveying system capable of continuously quickly making a three-dimensional measurement of a displacement but eliminating a necessity for signal lines for transmitting measured positional data.

It is another object of the present invention to provide a laser surveying system which is inexpensive, small in weight and is therefore not limited in terms of its installation space.

It is still another object of the present invention to provide a laser surveying system which eliminates a necessity for illumination devices at measuring points.

According to one aspect of the present invention, there is provided a laser surveying system comprising: a light projector for projecting a laser beam for sweeping an object; a reflector provided on the object and including an element for converting the laser beam into a reflected laser beam containing positional data in an intersecting direction intersecting a sweeping direction; and a light receiving unit for receiving the reflected laser beam and generating an output indicating a position of the object in the intersecting direction on the basis of the positional data.

According to another aspect of the present invention, there is provided a light projector for projecting a laser beam for sweeping an object; a reflector provided on the object and including an element for converting the laser beam into a reflected laser beam containing two-dimensional positional data within a perpendicular plane; and a light receiving unit for receiving the reflected laser beam and generating an output indicating a two-dimensional position of the object on the basis of the positional data.

According to still another aspect of the present invention, there is provided a light projector, for projecting a laser beam for sweeping an object, including a projecting direction detector for detecting a projecting direction of the laser beam; a reflector provided on the object and including an element for converting the laser beam into a reflected laser beam containing two-dimensional positional data within the perpendicular plane; and a light receiving unit for receiving the reflected laser beam and generating an output indicating a three-dimensional position of the object on the basis of the projecting direction and the positional data.

According to a further aspect of the present invention, there is provided a reflector provided on an object to reflect a laser beam projected by a light projector to sweep the object, comprising: a reflecting plate having at least a pair of edges, a spacing therebetween continuously changing in an intersecting direction intersecting a sweeping direction of the laser beam and at least a pair of edges, a spacing therebetween being fixed in the intersecting direction.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
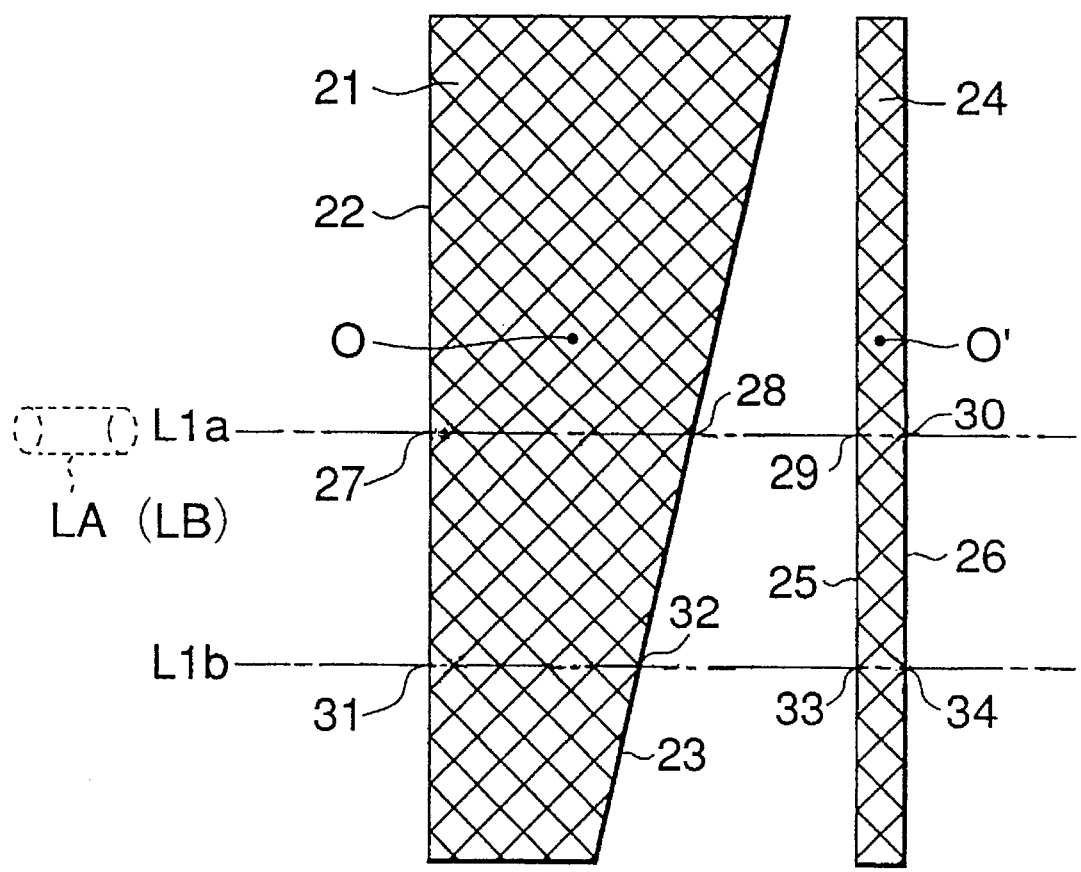
FIG. 1 is a diagram that assists in explaining the principle on which a reflecting surface supplies an item of positional data according to the present invention.

Referring to FIG. 1, a reflecting surface 21 is a reflective sheet for reflecting laser beams. A microprism is mounted on the surface of the reflex sheet. The microprism reflects the incident laser beams in an incidence direction. The reflecting surface 21 has edges 22, 23 that are not parallel to each other. Similarly, a reflecting surface 24 has edges 25, 26 parallel to each other. The edges 22, 23, 25, 26 intersect a sweeping direction of a laser beam LA sweeping from the left in FIG. 1. Points O, O' indicate respective fiducial positions of the reflecting surfaces 21, 24.

The laser beam LA, when sweeping the reflecting surfaces 21, 24 in a position L1a, traverses points 27, 28, 29, 30 of the edges 22, 23, 25, 26 of the reflecting surfaces 21, 24. The laser beam LA projected at this time is not reflected until the laser beam LA reaches the point 27 but is reflected from the point 27 to the point 28. Subsequently, the laser beam LA is not reflected from the point 28 to the point 29 but is again reflected from the point 29 to the point 30. The laser beam LA is not reflected any more after the point 30. Thus, the projected continuous laser beam is reflected as an intermittent laser beam.

Figure 2A:
FIGS. 2A, 2B and 2C are timing charts that assists in explaining the principle on which the reflecting surface supplies the positional data according to the present invention.
Figure 2B:
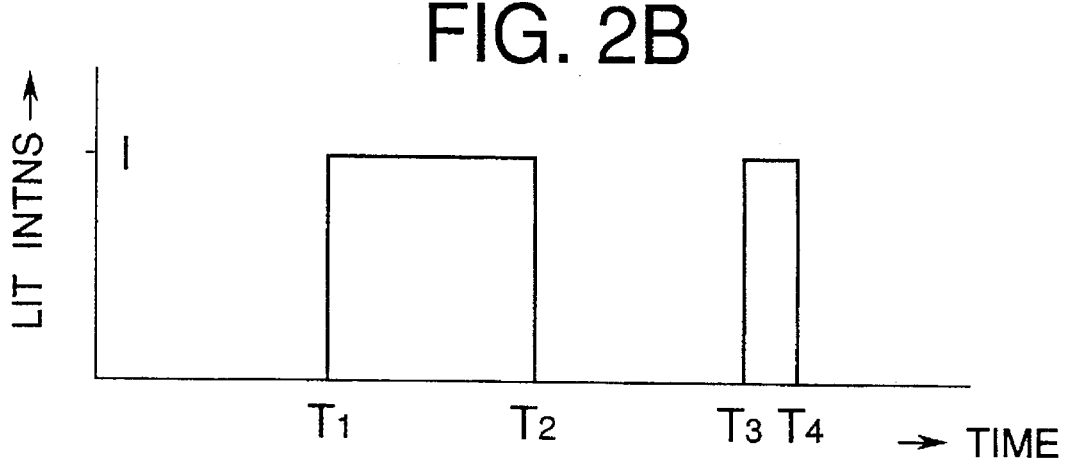
Figure 2C:
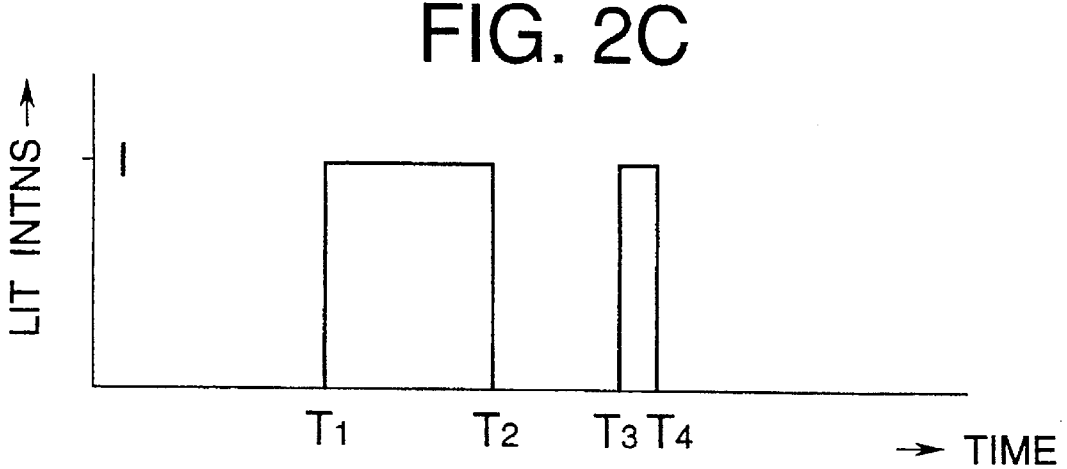
Figure 3:
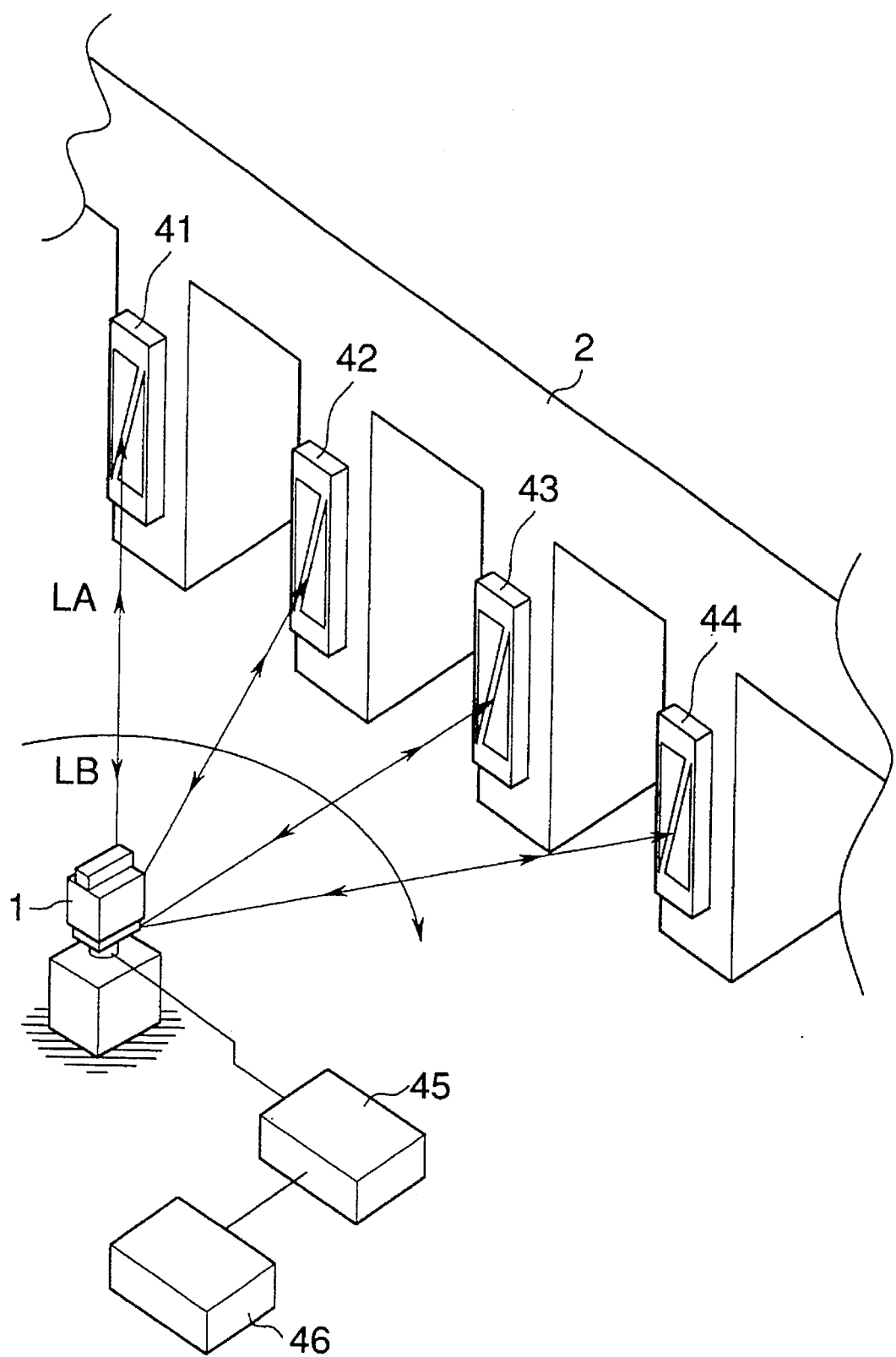
FIG. 3 is a perspective view illustrating a laser surveying system for measuring a displacement of a structure in accordance with one embodiment of the present invention.

FIGS. 2A, 2B and 2C are diagrams showing time-variations in intensity of the reflected laser beam. Referring first to FIG. 2A, the symbols T1, T2, T3, T4 respectively designate timings corresponding to the points, 27, 28, 29, 30 when the laser beam LA sweeps in the position L1a. The intensity of the reflected laser beam is I during a T1–T2 period and a T3–T4 period but 0 during a T2–T3 period.

Next, the laser beam LA, when sweeping in a position L1b, sweeps points 31, 32, 33, 34 of the edges 22, 23, 25, 26 of the reflecting surfaces 21, 24. Referring to FIG. 2B, the symbols T1, T2, T3, T4 individually denote timings corresponding to the points 31, 32, 33, 34 when the laser beam LA sweeps in the position L1b. The intensity of the reflected laser beam is I during the T1–T2 period and the T3–T4 period but 0 during the T2–T3 period.

As is obvious from a comparison between the two sweeping positions with reference to FIGS. 2A and 2B, the timing T2 when traversing the edge 23 changes but does not change at other timings T1, T3, T4. In this way, when the position of the laser beam LA shifts, a combination of the timings varies.

Further, there change distances between the reflecting surfaces 21, 24 and the light projector 1. In this case, if the laser beam LA sweeps at a fixed angular speed, a sweeping time between the edges 22 and 25 differs even when the laser beam LA sweeps in the same position L1a. The time-variation in the intensity of the reflected laser beam goes as changed from FIG. 2A to, e.g., FIG. 2C.

Further, the positions of the reflecting surfaces 21, 24 shift in the sweeping direction about the light projector 1. Even when the laser beam LA sweeps in the same position L1a, the timings of sweeping the respective edges 22, 23, 25, 26 uniformly deviate forward or backward.

Thus, the positional relationships between the fiducial positions O, O' of the reflecting surfaces 21, 24 and projected positions of the laser beams LA are represented in reflected laser beam LB as positional data appearing in the form of variations in terms of the light quantity or deviations in terms of the reflection timings.

One embodiment of the present invention will be discussed with reference to FIGS. 3 through 8C.

The laser surveying system in accordance with this embodiment is designed to measure a displacement of the structure. Paying attention to FIG. 3, the light projector 1 is installed at an unmovable point suitable for measuring the displacement. The light projector 1 projects the laser beams to sweep a structure 2. A plurality of reflecting devices 41, 42, 43, 44 are mounted at measuring points of the structure 2 and reflect the projected laser beams. The number of the reflecting devices may be increased or decreased depending on the number of measuring points. The laser beams are supplied with the positional data from the reflecting devices 41, 42, 43, 44 and reflected in the form of the laser beams LB. The laser beams LB travel back along light projection paths and return again to the light projector 1. The light projector 1 is provided with a light receiving device as will be stated later. A data recorder 45 outputs photoelectrically-converted positional data signals to a CPU 46. The CPU 46 processes the data and three-dimensionally analyzes a state of the displacement of the structure 2.

Figure 4:
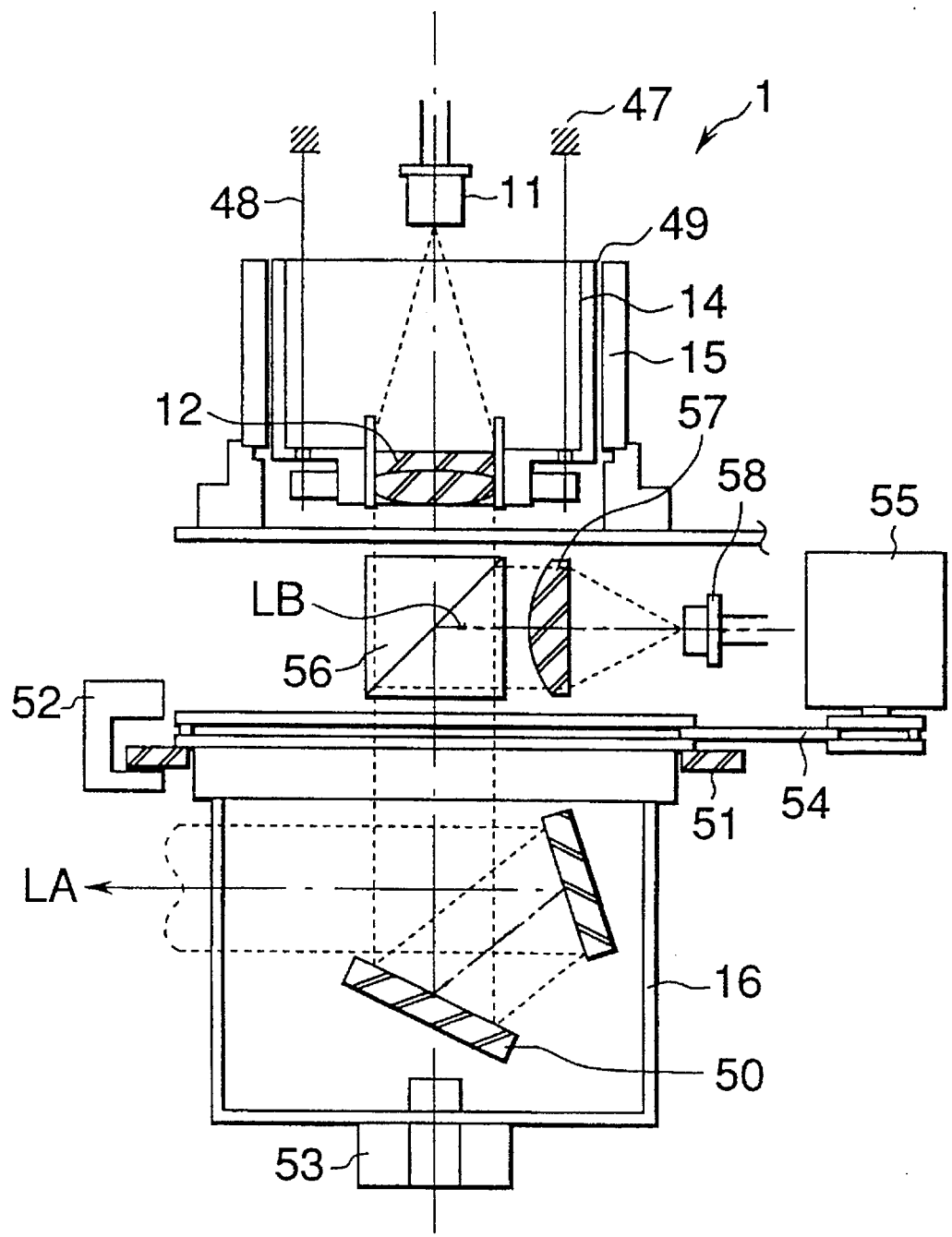
FIG. 4 is a sectional view illustrating a light projection mechanism in one embodiment of this invention.

The light projector 1 constituting this laser surveying system includes a light projection mechanism unit structured as shown in FIG. 4. A movable cylinder 14 is suspended from a body 47 by three lines of thin wires 48. The movable cylinder 14 is equipped with a collimating lens 12 for collimating laser beams from a laser diode 11 into substantially parallel laser beams LA. A fixed cylinder 15 fixed to the body 47 is provided outwardly of the movable cylinder 14. A trace of air gap 49 is formed between an outer peripheral surface of the movable cylinder 14 and an inner peripheral surface of the fixed cylinder 15.

A rotary unit 16 mounted under the movable cylinder 14 is provided fixedly with a pentagonal mirror 50 for reflecting the laser beam LA at approximately 90°. Fixed also to the rotary unit 16 is an absolute encoder disc 51 having gray codes. The absolute encoder disc 51 is formed with a rotary position detector together with a detector 52 fixed to the body.

The absolute encoder disc 51 detects rotational angles of the laser beams with a high accuracy. The absolute encoder disc 51 is capable of reading the rotational angles in absolute values when the laser beams LB reflected from the reflecting devices 41, 42, 43, 44 are incident on the light projector 1. The rotary unit 16 is rotatably supported on a bearing 53. Provided also is a motor 55 for rotating the rotary unit 16 through a belt 54.

A half-prism 56, a condenser lens 57 and a light receiving device 58 are provided between the collimating lens 12 provided on the body 47 and the penta-mirror 50. The laser beams LB reflected back to the light projector are incident on the light receiving device 58 and photoelectrically converted therein.

The following is an explanation of the principle of a tilt auto compensating mechanism. The movable cylinder 14 is suspended by the three wires 48 and therefore, when its suspending position relatively shifts with a tilt of the body 47, it is always moved in parallel by the action of gravity in the horizontal direction. The collimate lens 12 is fixed to the movable cylinder 14, and, hence, the laser beam from the laser diode 11 is inclined along the optical axis of the collimate lens 12 in the opposite direction with the same quantity of the tilt of the body. At this time, the size of the air gap 49 varies, and a flow resistance of the air is caused, thereby attenuating vibrations of the movable cylinder 14. The laser beam is always compensated in the perpendicular direction by the collimate lens 12 and subsequently reflected by the penta-mirror 50 to travel in the horizontal direction. The laser beams LA used for light projection form a horizontal surface with a rotation of the rotary unit 16.

Figure 5:
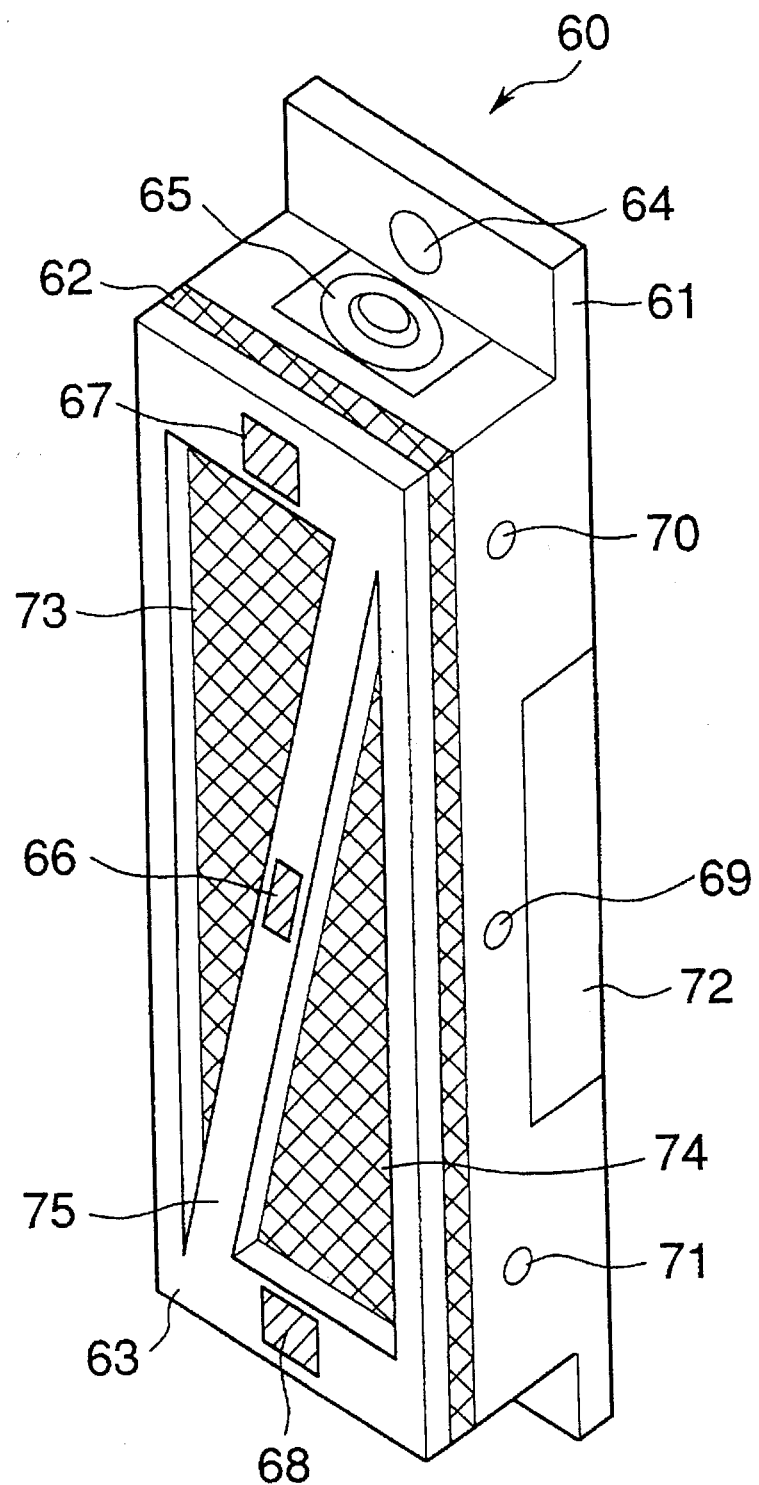
FIG. 5 is a perspective view of a reflecting device in one embodiment of this invention.

Each of reflecting devices 60 constituting this laser surveying system and installed at measuring points of the structure 2 is, as illustrated in FIG. 5, constructed of a reflex sheet 62 serving as a reflecting member stuck to a mounting plate 61 and a non-reflecting cover plate 63 covering the reflective sheet 62.

The mounting plate 61 is formed with a mounting hole 64 used when secured to the structure 2 and also provided with a bubble tube.

There are provided light receiving elements 66, 67, 68 and light emitting elements 69, 70, 71. When the laser beams LA are projected on the light receiving elements 66, 67, 68, the light emitting elements 69, 70, 71 corresponding thereto emit laser beams. A battery box 72 encases a battery for supplying the electric power to the light receiving elements 66, 67, 68 and the light emitting elements 69, 70, 71.

The cover plate 63 has two windows 73, 74. Each of the windows 73, 74 has the same right-angled triangle shape. When the reflecting devices are installed at the measuring points, the window 73 is so formed to increase in width in one direction orthogonal to the sweeping direction of the laser beam, while the window 74 is so formed as to increase in width in the direction opposite to the above-mentioned. Further, a band-like non-reflecting surface 75 is formed between the windows 73 and 74. The non-reflecting surface 75 completely segments positional data given by the windows 73, 74 and may have a size substantially equal to a diameter of the laser beam LA. The windows 73, 74 are arranged so that these two windows assume a substantially rectangular shape with the non-reflecting surface 75 being interposed therebetween.

Figure 6:
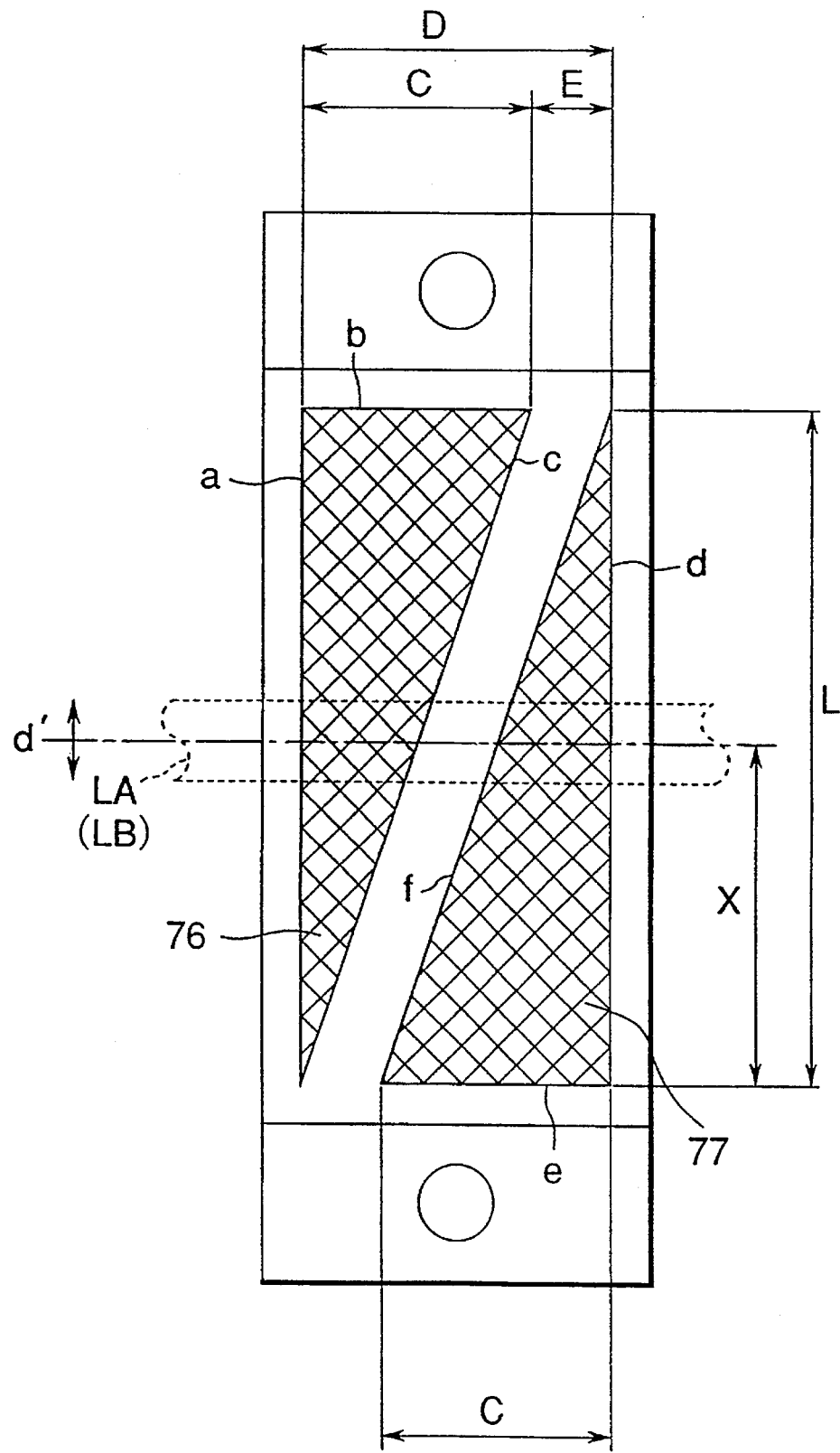
FIG. 6 is a front view of a reflecting surface of the reflecting device in one embodiment of the present invention.

Reflecting surfaces 76, 77 shown in FIG. 6 are not individually covered with the cover plate 63 of the reflective sheet 62. The reflecting surfaces 76, 77 correspond to the windows 73, 74 and therefore have the same shape.

Referring to FIG. 6, the symbol C represents a length of each of edges b, e of the reflecting surfaces 76, 77 in the sweeping direction of the laser beam LA, L designates a length of each of edges a, d in the direction that is perpendicular to the sweeping direction, E denotes an interval between an edge c of the reflecting surface 76 and an edge f of the reflecting surface 77 in the sweeping direction of the laser beam LA, D represents a total length (pitch) of the edge a of the reflecting surface 76 and the edge d of the reflecting surface 77 in the sweeping direction of the laser beam LA, X indicates a distance (beam height of the reflecting device) from the edge e of the reflecting surface 77 to the sweeping position of the laser beam LA, and d' designates a diameter of the laser beam LA.

Figure 7:
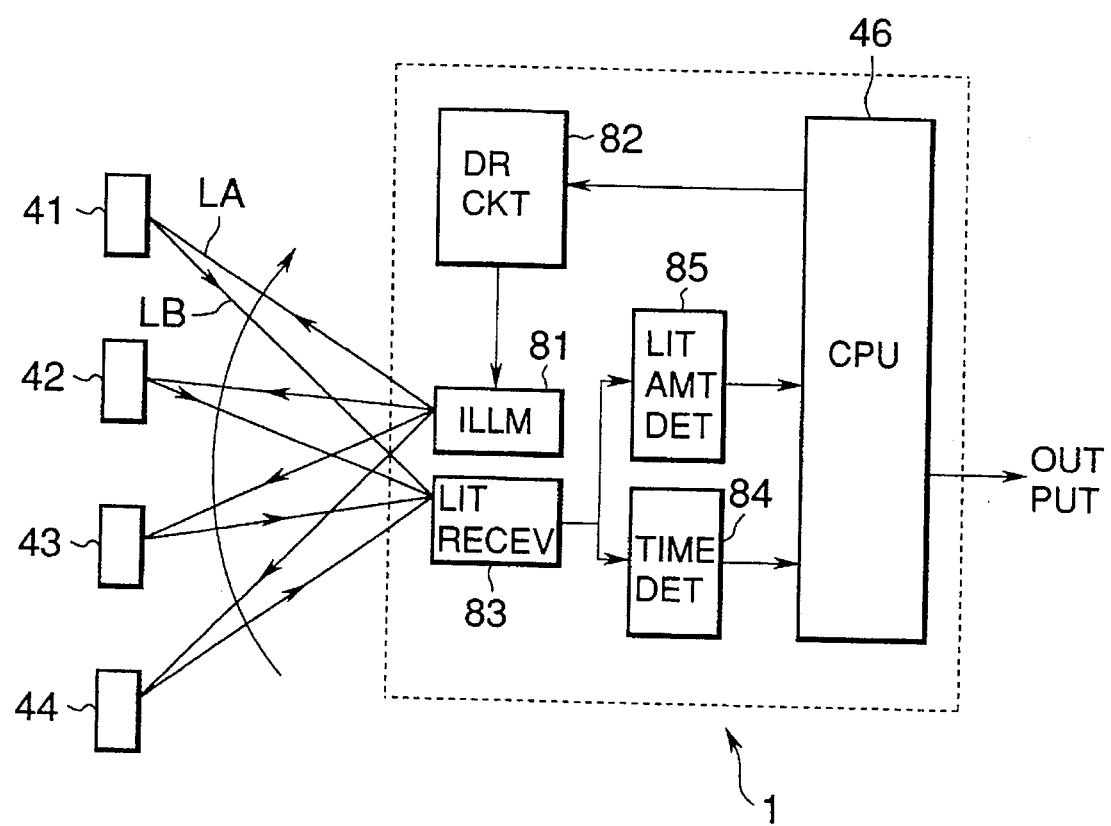
FIG. 7 is a block diagram showing the laser surveying system in one embodiment of the present invention.

FIG. 7 is a system block diagram illustrating the reflecting devices and the light projector. The light projector incorporates a laser beam emitting unit 81 serving as a light source driven by a light emission drive circuit 82 and thereby emitting and projecting the laser beam LA. A laser beam receiving unit 83 is a light receiving device for receiving the incident laser beams LB traveling back, when the laser beams projected by the plurality of reflecting devices 41, 42, 43, 44 are reflected, along the light projection path.

A time detection circuit 84 detects a light receiving time of the laser beam incident on the laser beam receiving unit 83. A light quantity detection circuit 85 detects a light quantity of the laser beam incident on the laser beam receiving unit 83.

A computer-assisted CPU 46 controls the light emission drive circuit 82, arithmetically processes an item of time data given from the time detection circuit 84 and an item of light quantity data from the light quantity detection circuit 85 and outputs respective items of displacement data.

Next, the operation in this embodiment will be described.

The light projector 1 is installed at an unmovable point so as to look over the measuring points for measuring a displacement of the structure 2. Then, when rough levelling is conducted by use of a levelling screw (unillustrated), the levelling is thereafter automatically performed. Also, the plurality of reflecting devices 41, 42, 43, 44 are mounted at the plurality of measuring points of the structure 2 by effecting an alignment with the aid of a light receiving device 66 and a light emitting device 69.

The laser diode 11 is switched ON, and the light projector 1 emits the laser beams LA. The laser beams LA are collimated by the collimating lens 12 into substantially parallel laser beams. The laser beams LA are reflected by the penta-mirror 50 fitted to the rotary unit 16 and travel in the horizontal direction. The projecting direction is kept in the horizontal direction on the basis of the above-mentioned principle, and the laser beams LA sweep with a rotary period F. An angle of rotation is detected by the absolute encoder disc 51 and the detector 52.

The laser beams LA are projected on the plurality of reflecting devices 41, 42, 43, 44, which reflect the laser beams LB supplied with the positional data from the reflecting surfaces 76, 77.

The positional data in the reflecting device 41 is supplied in the following manner. In each of the reflecting devices 41, 42, 43, 44 as illustrated in FIG. 6, the laser beam LA is projected in the form of a beam spot having a diameter d'. The laser beam LA performs sweeping from the left edge a up to the right edge d of the reflecting surface 76 from left to right in the figure.

Figure 8A:
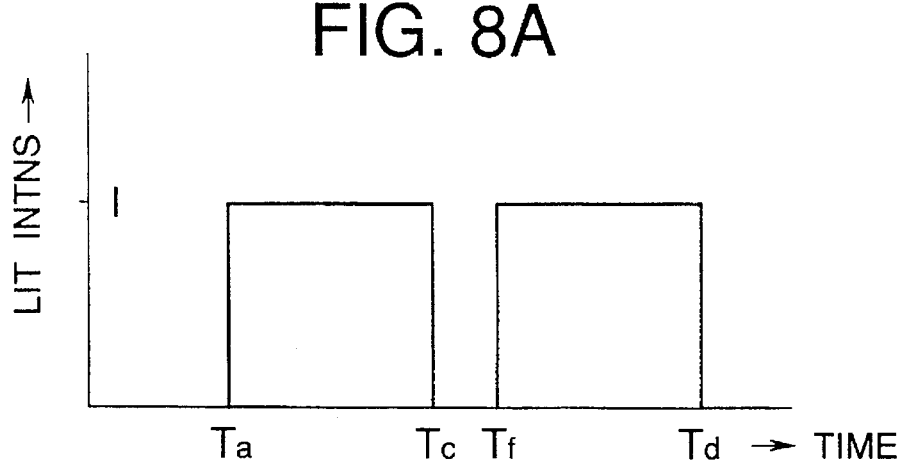
FIGS. 8A, 8B and 8C are timing charts each showing an intensity of a reflected laser beam in one embodiment of this invention.
Figure 8B:
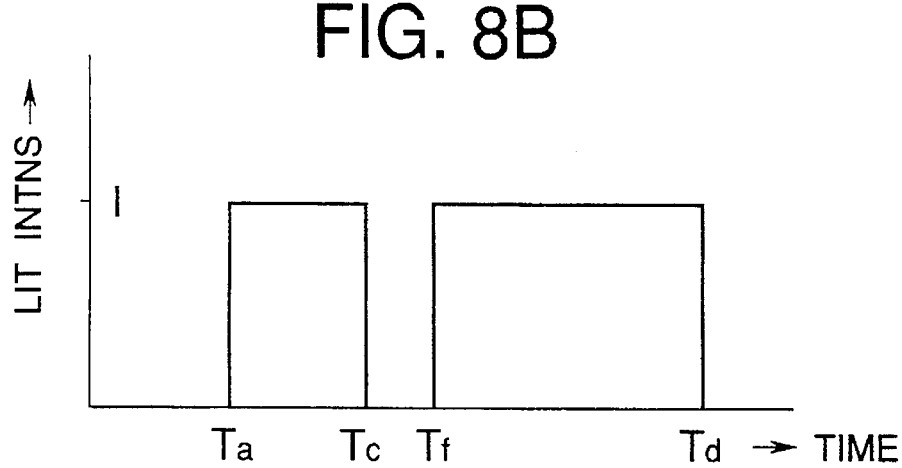
Figure 8C:
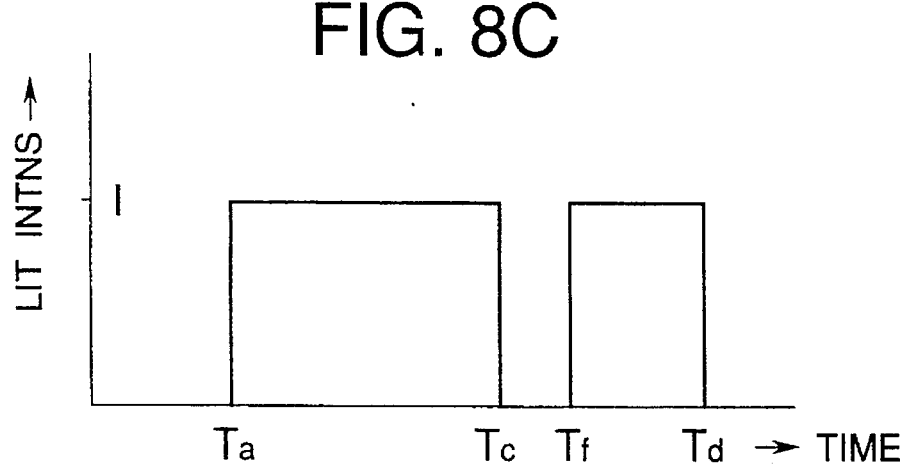

FIGS. 8A, 8B and 8C show this sweeping in terms of a time-variation in the intensity of the reflected laser beam. Let Ta, Tc, Tf, Td be the timings at which the laser beam LA sweeps the edges a, c, f, d. When the laser beam LA sweeps the central position, i.e., a position given by X=L/2, as illustrated in FIG. 8A, a sweeping time of the reflecting surface 76 is equal to that of the reflecting surface 77, viz., Tc−Ta=Td−Tf. When the laser beam LA sweeps a position lower than the central position (x<L/2) and sweeps a position higher than the central position (y>L/2), as respectively illustrated in FIGS. 8B and 8C, the relationships are given such as Tc−Ta<Td−Tf, and Tc−Ta>Td−Tf. Under these conditions, Tf−Tc is fixed.

Note that when the laser beam LA sweeps a position higher (x>L) or lower (x<0) than the reflecting surfaces 76, 77, the laser beam LA is incident on the light receiving device 67 or 68, and light emitting device 70 or 71 emits the light, with the result that the normal positional data is not given in this state.

The laser beams LB sequentially reflected by the reflecting devices 41, 42, 43, 44 return to the light projector 1. The laser beams LB are then incident on the laser beam receiving unit 83 and photoelectrically converted therein. Subsequently, a receiving time is detected by the time detection circuit 84, and the CPU 46 effects the arithmetic based on the light receiving time. Alternatively, a light receiving quantity is detected by the light quantity detecting circuit 85, and the CPU 46 performs the arithmetic based on the light receiving quantity.

A beam height X of the reflecting device, which represents a position of the laser beam LA, is calculated as follows. The beam height X is calculated from times needed for individually sweeping the reflecting surfaces 76, 77 in accordance with the following formula:

$$X = \frac{L}{t2/t1 + 1} \quad (1)$$

where t1=Tc−Ta, and
t2=Td−Tf.

Further, the beam height X is calculated in the following way. The light quantity of the laser beam LA incident on the laser beam receiving unit 83 is proportional to the sweeping time, and let A, B be the light receiving quantities from the reflecting surfaces 76, 77, there is established a relationship such as B/A=t2/t1. Hence, the formula (2) is deduced from the formula (1).

$$X = \frac{L}{B/A + 1} \quad (2)$$

The distance R between the light projector 1 and the reflecting device 41 is calculated from a time Td−Ta that is required for sweeping a space between the edges a and d of the reflecting surfaces 76, 77 in accordance with the formula (3):

$$R = FD/2\pi t3 \quad (3)$$

where $t3 = Td - Ta,$

F is the rotary period of the laser beam LA, and D is the pitch.

The absolute encoder disc 51 is capable of measuring displacement of the reflecting devices 41, 42, 43, 44 in the sweeping direction of the laser beam LA. That is, when the laser beams LB travel back to the light projector from the reflecting devices 41, 42, 43, 44, the laser beam receiving unit 83 outputs light receiving signals, respectively. The time detection circuit 84 detects receiving times from the outputted light receiving signals. Based on the detected light receiving times, the detector 52 detects and outputs an angle of rotation of the absolute encoder disc 51 with respect to the laser beam LA. The CPU 46 is therefore capable of reading the angle of rotation in the direction of each of the reflecting devices 41, 42, 43, 44.

Let θ be the angle of rotation in the direction of the reflecting device 41, and R is the distance between the light projector 1 and the reflecting device 41.

Hence, the CPU 46 calculates a displacement quantity Y with which the reflecting device 41 actually displaces in the sweeping direction of the laser beam LA, the displacement quantity Y being given by:

$$Y = R \sin\theta \quad (4)$$

Displacement quantities of the reflecting devices 42, 43, 44 are also calculated in the same way.

Further, the absolute encoder disc 51 detects absolute values, whereby the reflecting devices 41, 42, 43, 44 are simultaneously identified.

In this way, it is possible to obtain the positional data about the height of the laser beam, the position in the sweeping direction thereof and the distance, respectively. Namely, the displacement of the structure 2 can be three-dimensionally detected. A value of the displacement is stored and displayed on a data recorder (unillustrated), and further a state of the displacement is three-dimensionally analyzed.

Another embodiment of the present invention will be discussed with reference to FIGS. 9 through 10C.

This embodiment presents a different configuration of the reflecting surface of the reflecting device from that in the preceding embodiment. Note that a detailed explanation of the same or similar elements to those in the preceding embodiment will be omitted.

Elongate and rectangular reflecting surfaces 93, 94, 95 are spaced away from each other corresponding to windows formed in a cover plate 92 of a reflecting device 91. The reflecting surface 94 is disposed in parallel to the reflecting surface 93, whereas the reflecting surface 95 is tilted relative to the reflecting surface 93. Let g, h, i, j, k, l be the edges of the reflecting surfaces 93, 94, 95 from the left in the Figure.

Next, the operation in this embodiment will be described.

Figure 9:
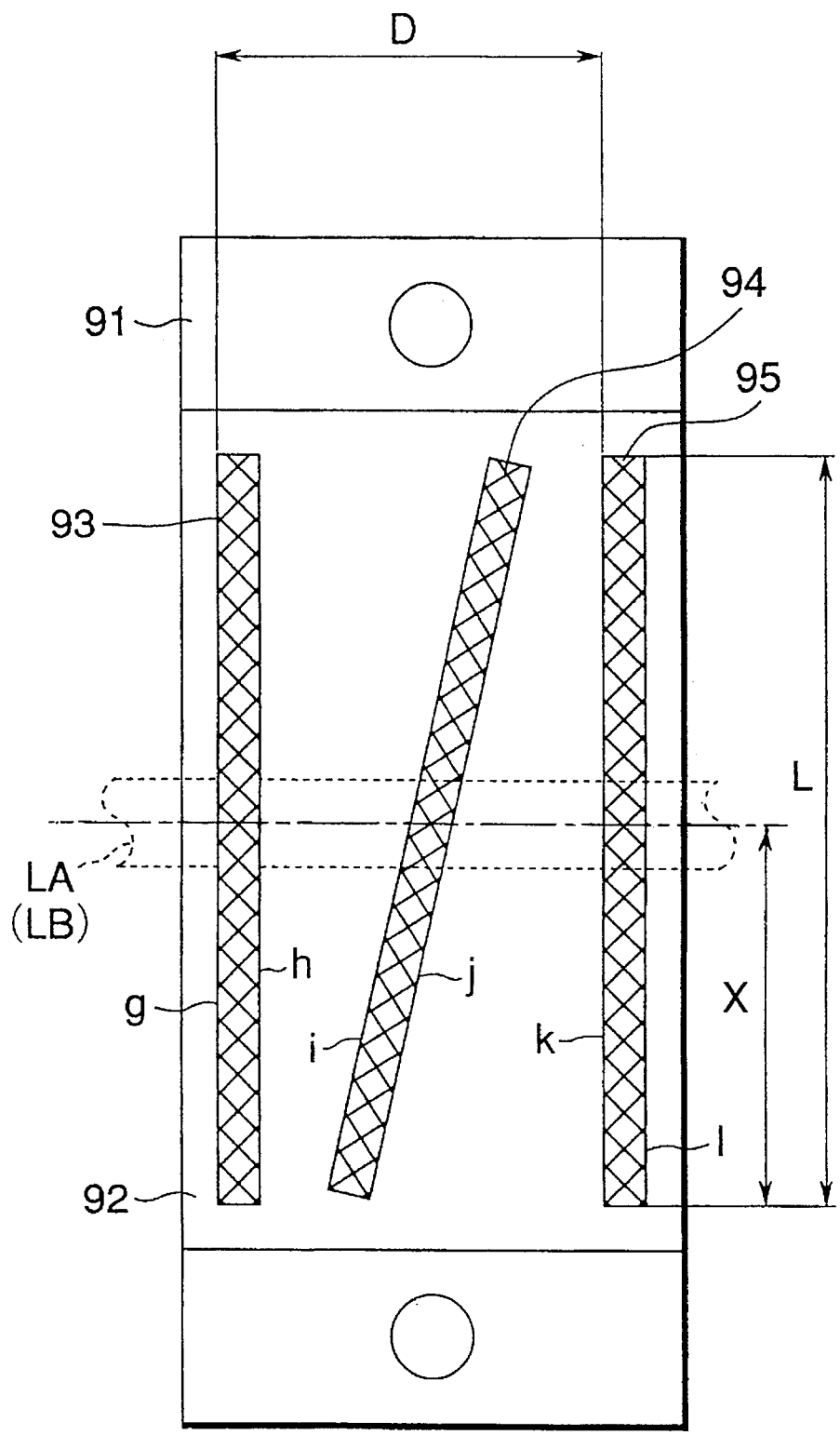
FIG. 9 is a front view of the reflecting device in another embodiment of this invention.
Figure 10A:
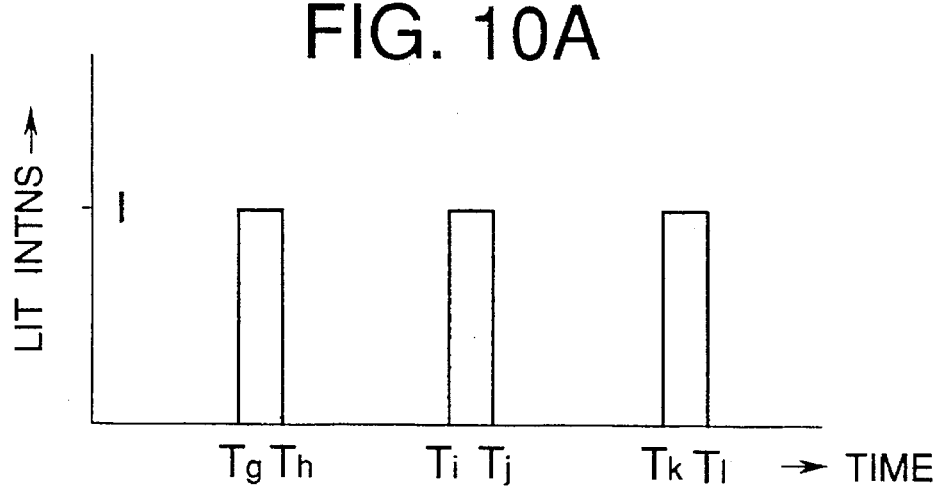
FIGS. 10A, 10B and 10C are timing charts each showing an intensity of the reflected laser beam in another embodiment of the present invention.
Figure 10B:
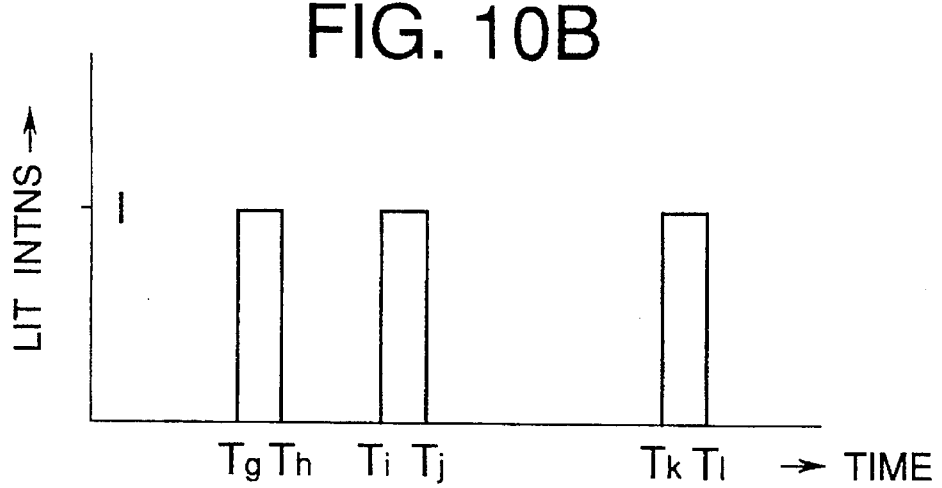
Figure 10C:
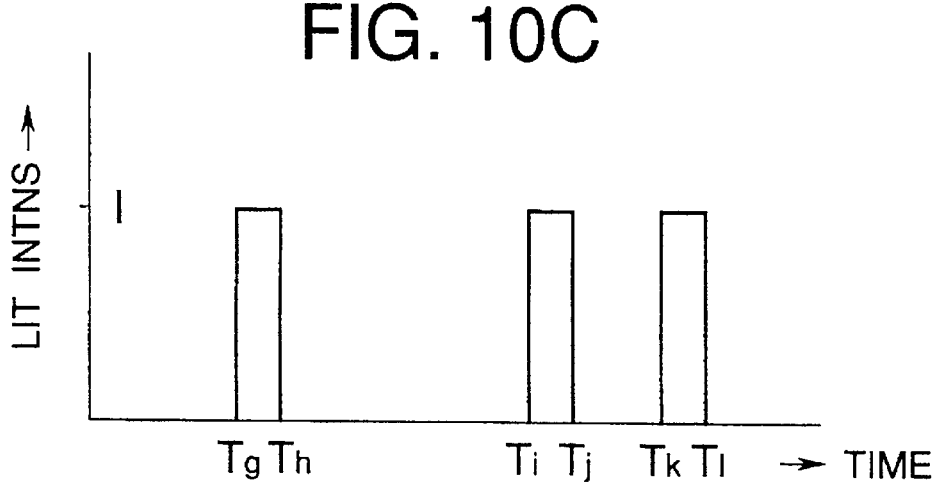
Figure 11:
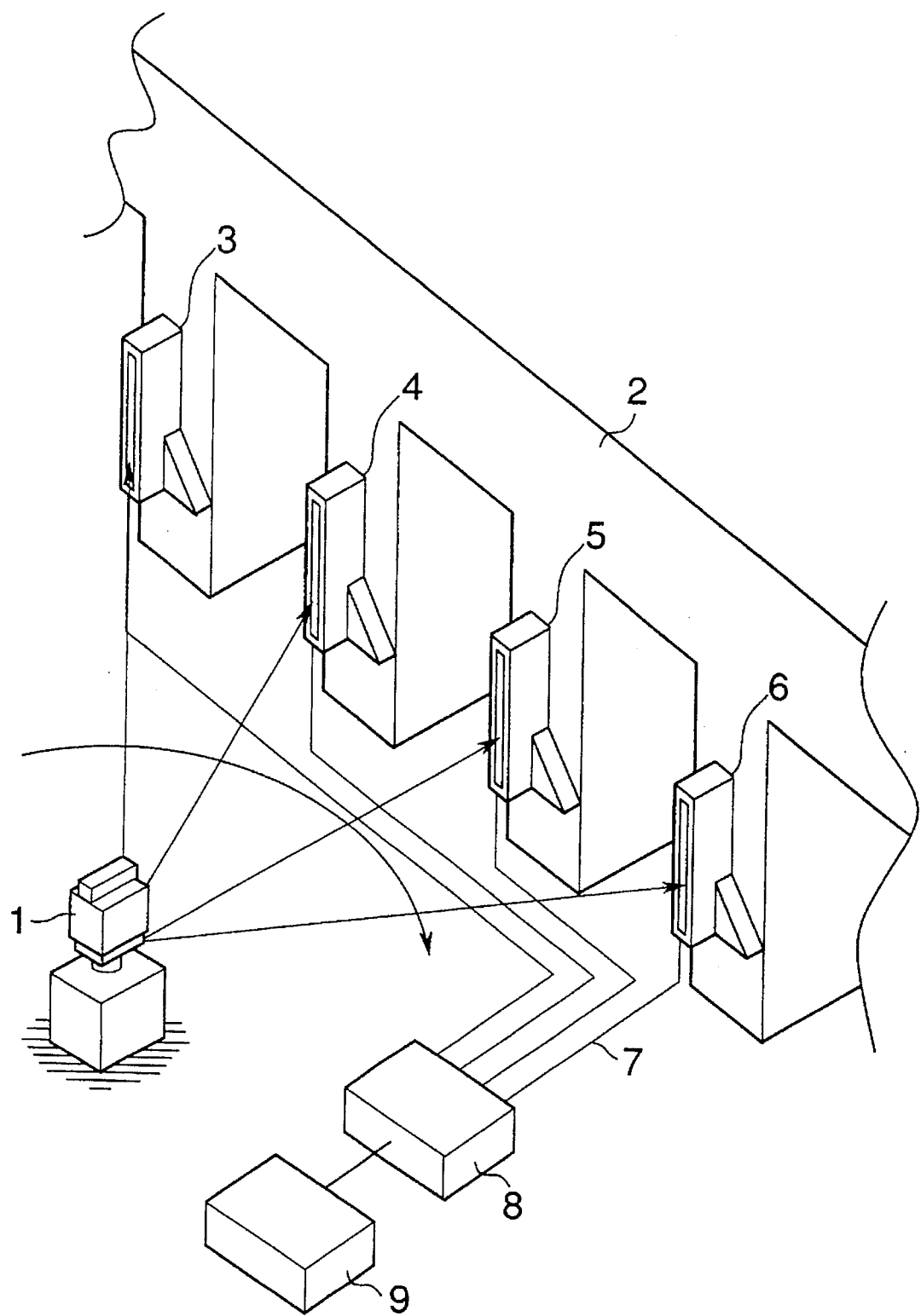
FIG. 11 is a perspective view illustrating a whole laser surveying system in a conventional example.
Figure 12:
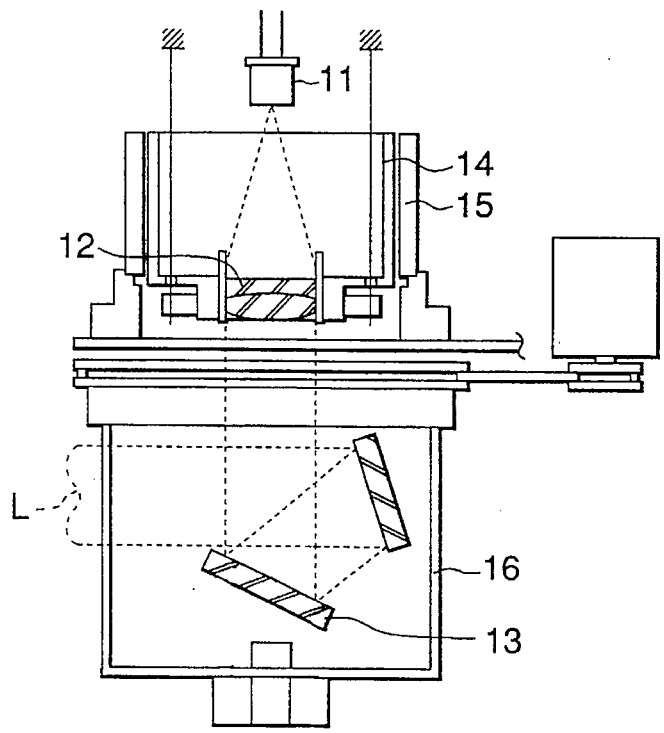
FIG. 12 is a sectional view illustrating a light projection mechanism in the conventional example.
Figure 13:
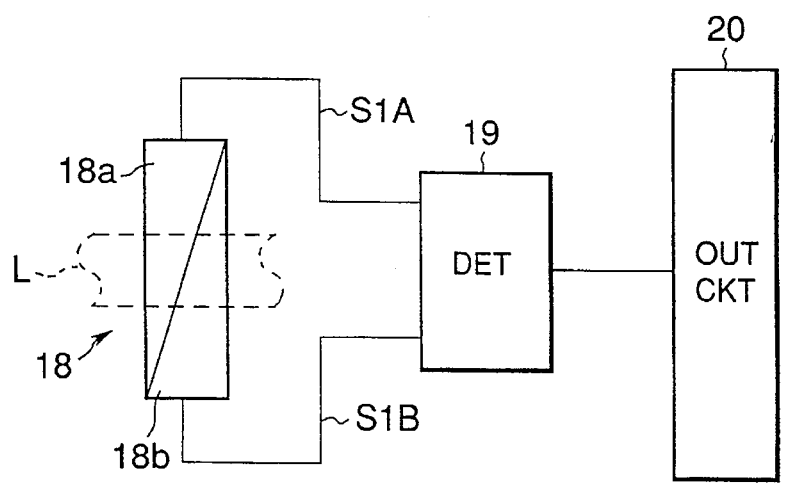
FIG. 13 is a block diagram illustrating a light receiving device in the conventional example.

In the reflecting device 91, as illustrated in FIG. 9, the laser beam LA effects sweeping from the left edge g of the reflecting surface 93 up to the right edge l of the reflecting surface 94. FIGS. 10A, 10B and 10C show time-variations in the intensity of the laser beam reflected. Let Tg, Th, Ti, Tj, Tk, Tl be the timings at which the laser beam LA sweeps the edges g, h, i, j, k, l. When the laser beam LA sweeps the central position, i.e., a position given by X=L/2, as illustrated in FIG. 10A, there is established an equation such as Ti−Tg=Tk−Ti. When the laser beam LA sweeps a position lower than the central position (X<L/2) and sweeps a position higher than the central position (X>L/2), as respectively illustrated in FIGS. 10B and 10C, the relationships are given such as Ti−Tg<Tk−Ti, and Ti−Tg>Tk−Ti. From the values given by Tg−Ti and Ti−Tk, the beam height X is calculated, and the distance R is calculated from the value given by Tk−Tg.

In the above two embodiments, any edge of the reflecting surface that the laser beam traverses is a straight line, but it may be a curve. Further, the reflecting surface may supply the positional data in terms of a reflective index, a reflection wavelength and a degree of polarization.

It is also feasible to separate the light projector from the light receiving device by use of a scattering reflecting plate rather than the reflective sheet.

The laser beam can be projected in a direction, e.g., a perpendicular direction, other than the horizontal direction. For instance, the light projector involves the use of a prism for changing the angle, thereby making it possible to project the laser beam in an arbitrary direction.

Furthermore, the above two embodiments are applicable to any kinds of surveying systems such as a machine control system for a heavy construction machine, a tunnel shield machine control system, a setting-out operation in architecture and a verticalizing operation of a variety of supports. The invention can also be practiced using embodiments that substitute other to light sources for the laser light source.

It is apparent that, in this invention, a wide range of different working modes can be formed based on the invention without deviating from the spirit and scope of the invention. This invention is not restricted by its specific working modes except being limited by the appended claims.

What is claimed is:

1. A laser surveying system comprising:

a light projector which projects a laser beam in a direction that rotates around a rotational axis and within a plane perpendicular to said rotational axis to sweep an object;

an angle detector to detect a rotational angle, at which said laser beam is being projected, substantially continuously throughout a sweep range of said laser beam;

a reflector to be provided on the object and including means for converting said laser beam into a reflected laser beam containing two-dimensional positional data; and a light receiving unit which receives the reflected laser beam and generates an output indicating a three-dimensional position of the reflector based on the rotational angle detected by said angle detector and the two-dimensional positional data contained in the reflected laser beam.

2. A laser surveying system according to claim 1, further comprising a position computer for determining the three-dimensional position of the reflector based on the output from said light receiving unit.

3. A laser surveying system according to claim 1, wherein said reflector further includes a reflecting plate having at least a pair of edges, a spacing therebetween continuously changing along a direction intersecting said plane.

4. A laser surveying system according to claim 3, wherein said two-dimensional positional data includes data about a time-interval over which the laser beam traverses the pair of edges.

5. A laser surveying system according to claim 4, further comprising:

a time-interval measuring unit for measuring the time-interval based on the data about the time-interval; and a position computer for determining the three-dimensional position of the reflector based on the measured time-interval.

6. A laser surveying system according to claim 3, wherein said two-dimensional positional data includes data about a light quantity of the reflected laser beam when the laser beam traverses the pair of edges.

7. A laser surveying system according to claim 1, wherein said reflector includes a first reflecting area of which the spacing between a pair of edges increases along one direction intersecting said plane and a second reflecting area of which the spacing between a pair of edges increases along a direction opposite to said one direction.

8. A laser surveying system according to claim 1, wherein said reflector further includes:

a light receiving device for generating an output upon receiving said laser beam at a predetermined position within a positional range defined by said converting means; and a display unit that responds to the output of said light receiving device.

9. A laser surveying system according to claim 1, wherein said reflector further includes:

a light receiving device for generating an output upon receiving said laser beam at a predetermined position outside of a positional range defined by said converting means; and a display unit that responds to the output of said light receiving device.

10. A laser surveying system according to claim 1, further comprising a housing which accommodates said light projector and said light receiving unit.

11. A laser surveying system comprising:

a light projector which projects a laser beam to sweep an object;

a reflector to be provided on the object and including means for converting said laser beam into a reflected laser beam containing positional data in an intersecting direction intersecting a sweeping direction of said laser beam, said reflector further including a light receiving element to receive said laser beam at a predetermined position within a positional range defined by said converting means, and an indicator which responds to an output from said light receiving element; and a light receiving unit which receives the reflected laser beam and generates an output indicating a position of the reflector in the intersecting direction based on the positional data.

12. A laser surveying system comprising:

a light projector which projects a laser beam to sweep an object;

a reflector to be provided on the object and including means for converting said laser beam into a reflected laser beam containing positional data in an intersecting direction intersecting a sweeping direction of said laser beam, said reflector further including a light receiving element to receive said laser beam at a predetermined position outside of a positional range defined by said converting means, and an indicator which responds to an output from said light receiving element; and a light receiving unit which receives the reflected laser beam and generates an output indicating a position of the reflector in the intersecting direction based on the positional data.

13. A laser surveying system comprising:

a light projector which projects a laser beam in a direction that rotates around a rotational axis and within a plane perpendicular to said rotational axis to sweep an object;

an angle detector to detect a rotational angle, at which said laser beam is being projected, substantially continuously throughout a sweep range of said laser beam;

at least one reflector to be provided on the object and including a transformer for transforming said laser beam into a reflected laser beam containing positional data in an intersecting direction intersecting said plane; and a light receiving unit which receives the reflected laser beam and generates an output indicating a position of the reflector in the intersecting direction and within said plane based on the rotational angle detected by said angle detector and the positional data.

14. A laser surveying system comprising:

a light projector which projects a laser beam in a direction that rotates around a rotational axis and within a plane perpendicular to said rotational axis to sweep an object;

an angle detector to detect a rotational angle, at which said laser beam is being projected, substantially continuously throughout a sweep range of said laser beam;

a plurality of reflectors to be respectively provided at different places on the object, and each including a transformer for transforming said laser beam into a reflected laser beam containing positional data in an intersecting direction intersecting said plane; and a light receiving unit which receives the reflected laser beams and generates an output indicating a position of each of said plurality of reflectors in a rotational direction, based on the corresponding rotational angles detected by said angle detector, and generates an output indicating a position of each of said plurality of reflectors in the intersecting direction, based on the corresponding positional data.

* * * * *